United States Patent [19]
Gupta

[11] 3,852,743
[45] Dec. 3, 1974

[54] HOMODYNE DOPPLER RADAR WITH INCREASED TARGET SENSITIVITY

[75] Inventor: Radha Raman Gupta, Southfield, Mich.

[73] Assignee: The Bendix Corporation, Southfield, Mich.

[22] Filed: Sept. 18, 1970

[21] Appl. No.: 73,281

[52] U.S. Cl. .................................................. 343/8
[51] Int. Cl. ............................................. G01s 9/44
[58] Field of Search ........................................ 343/8

[56] References Cited
UNITED STATES PATENTS
3,383,682  5/1968  Stephens ............................ 343/8 X
3,611,374  10/1971  Draysey ............................ 343/8 X Primary Examiner—T. H. Tubbesing
Attorney, Agent, or Firm—Lester L. Hallacher

[57] ABSTRACT

A doppler radar system for detecting targets present within a short range is described. The radar system utilizes a Gunn diode which serves as both a transmitting oscillator and a frequency converter to produce the doppler frequency. A sensitivity optimizing element is placed between the Gunn diode cavity and the antenna to increase the target detection sensitivity, which is an increase in the doppler frequency output. Basically, the sensitivity optimizing element is a microwave discontinuity which is adjusted to optimize target detection sensitivity while maintaining sufficient power output from the Gunn diode.

13 Claims, 4 Drawing Figures

PATENTED DEC 3 1974

INVENTOR
RADHA R. GUPTA

BY *[signature]*

ATTORNEY

HOMODYNE DOPPLER RADAR WITH INCREASED TARGET SENSITIVITY

BACKGROUND OF THE INVENTION

The use of Gunn diodes as a transmitting source in doppler radar systems is a relatively new, but nevertheless well known technique. In radar systems employing Gunn diodes, the diode is placed in the antenna where it serves as both the transmitting oscillator and the frequency converter which develops the intermediate or doppler frequency output. Therefore, when employed in such usages, the diode also serves as a frequency converter in which the relatively large oscillator signal is combined with an imcoming signal and a difference frequency component, normally called the doppler frequency, is generated. The incoming signal is a reflected signal which is caused by the reflection of the transmitted signal from a target having a relative velocity with respect to the radar system.

The Gunn diode, therefore, has an application in short distance homodyne doppler radar where a single diode is employed as a transmitting oscillator and also a frequency converter. An article which more fully describes doppler radar systems employing Gunn diodes which is entitled, "Self-Excited Microwave Mixer with a Gunn Diode and its Applications to Doppler Radar" by S. Nagano, H. Ueno, H. Kondo, and H. Murakami appeared on page 112 of the March, 1969 issue, Vol. 52, No. 3 of *Electronics and Communications in Japan*.

Although doppler radar systems employing Gunn diodes have certain usages as short range radar systems, they suffer the inherent limitation of having a rather low target detection sensitivity. Attempts at increasing the sensitivity of the radar systems ordinarily are directed to increasing the power output transmitted from the antenna. This is a logical approach because intuitively it seems that if the radiated power is maximized the reflected signal will also be maximized and the sensitivity will accordingly be maximized.

SUMMARY OF THE INVENTION

The inventive doppler radar system is of the type which employs a Gunn diode described hereinabove. However, the inventive doppler radar system has a greater moving target detection sensitivity than any of those described in the prior art. The increase in target detection sensitivity is achieved by the use of a microwave discontinuity which optimizes the doppler frequency signal, without an attempt to maximize the radiated power.

Optimum detection sensitivity of a Gunn diode doppler radar system has been found to usually correspond to the most efficient functioning of the Gunn diode as an oscillator. However, this does not necessarily result in maximum power being radiated by the radar system. Tests have shown that an improvement of at least 5DB in target detection sensitivity can be realized by the inclusion of a doppler frequency tuner in the microwave circuit of the radar. The tuner consists of a microwave discontinuity which is placed between the Gunn diode cavity and the transmitting-receiving antenna. The discontinuity can be formed from a pair of metal screws which are spaced by a quarter of a wavelength of the transmitting frequency. Alternatively, a single screw can be used as the tuning element and its exact location between the cavity and the antenna is not critical, so long as it is not located a half-wavelength, or an integral multiple of a half-wavelength from the cavity.

The instant invention is different from the prior art systems primarily in the manner in which the target detection sensitivity is maximized. In the prior art, it is commonly felt that the maximization of the sensitivity of the radar system can be best accomplished by maximizing the power output. Because the power output is maximized, it is felt that the reflected power is also maximized and that this, therefore, would naturally result in a maximum doppler signal, and hence maximum target detection sensitivity. For this reason in the prior art, tuning devices are ordinarily used to tune the oscillating mechanism such that the power radiated is maximized. The tuning is accomplished by using a microwave tuning element which matches the oscillator impedance to the antenna impedance.

The instant invention differs from this concept in that a microwave discontinuity is adjusted until the doppler frequency power is maximized. This almost invariably will result in operation at a radiated power level which is lower than the power obtained when the radiated power is tuned to a maximum, and accordingly, also results in a decrease in the power of the signal reflected from the target. However, because the doppler frequency component is optimized, the sensitivity of the system is also optimized irrespective of the fact that the radiated power has been somewhat decreased by the microwave discontinuity. The doppler frequency tuner is adjusted so that increased sensitivity of the system is achieved at all differing load conditions. The load condition may change from a voltage standing wave ratio of 1 to $\infty$.

Experimental tests show that the maximizing of the doppler output results in a 5–10 DB increase in radar sensitivity of the system. Translating this into system parameters, it becomes evident that a system tuned in accordance with the prior art technique of maximizing radiated power and which then has a maximum range of, say, 100 feet can have an increased range of 150–200 feet by tuning the system in accordance with the inventive concept of maximizing the doppler frequency component by use of a microwave tuning element.

DETAILED DESCRIPTION

Figure 1:
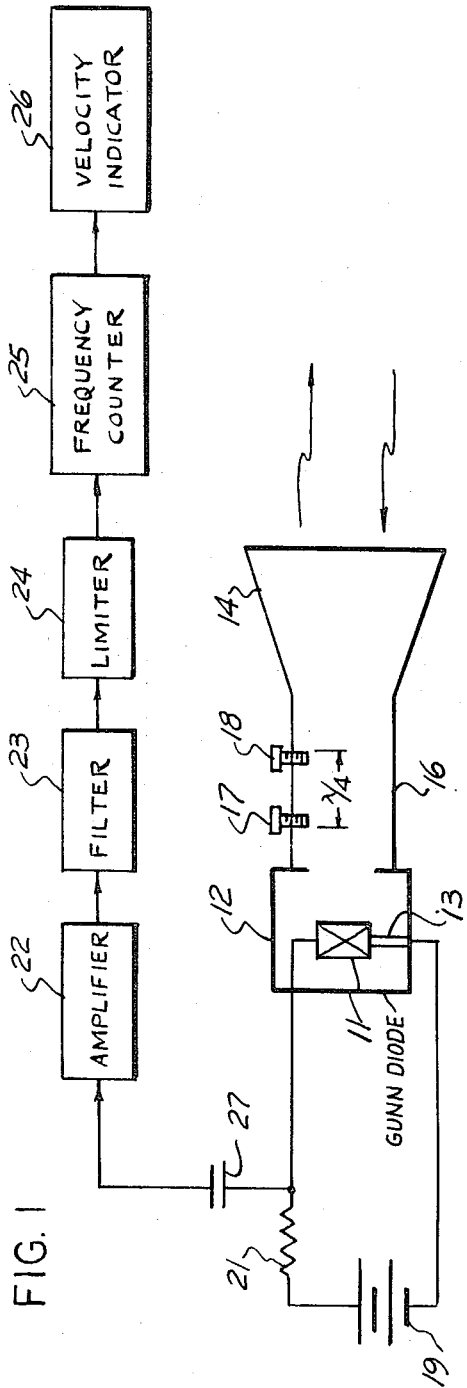
FIG. 1 is a preferred embodiment of the invention.

The doppler radar system shown in FIG. 1 includes a Gunn diode 11 which is positioned in a resonating cavity 12. Gunn diode 11 is mechanically supported within resonant cavity 12 by means of a grounding post 13 which also serves as a heat sink to prevent overheating of diode 11.

Cavity 12 is coupled to a transmitting-receiving antenna 14 by way of a waveguide 16. Two mechanical screws 17 and 18 are arranged within the waveguide 16. These screws serve as a microwave discontinuity, and therefore, can be used to tune the doppler radar system to maximize the doppler frequency component, and thereby increase the target detection sensitivity of the system. Accordingly, the two screws 17 and 18 are separated by a distance which is equal to a quarter wavelength of the transmitted frequency. It should be noted that the exact positioning of the pair of screws between resonant cavity 12 and the antenna 14 is unimportant.

It should also be noted that a single screw can be used as the microwave discontinuity, and will adequately serve as the tuning element to increase the target detection sensitivity of the system. In those instances in which a single screw is used, the exact positioning of the screw between the resonant cavity 12 and the antenna 14 is not critical, as explained hereinabove.

A serially connected biasing battery 19 and a load resistor 21 are connected across the Gunn diode. The values of the battery 19 and load resistor 21 are chosen to cause Gunn diode 11 to go into continuous oscillation at a preselected frequency. The frequency of oscillation can be varied within reasonable limits by varying the voltage applied across the diode. Obviously, this can be affected by using a variable resistor in place of the load resistor 21 or by providing a mechanism for varying the voltage output from the biasing source 19.

The A.C. component voltage drop across the Gunn diode 12 is applied to the input of an amplifier 22. Capacitor 27 prevents the D.C. component from appearing at the input terminal of amplifier 22.

After amplification, the doppler signal is acted upon by filter 23, limiter 24, and frequency counter 25. These circuits operate in a known manner to process the doppler frequency developed in Gunn diode 11 so that the output of frequency counter 25 is indicative of the range to a detected target. The frequency counter 25 output is then input to a velocity indicator 26 which is used to yield an indication of the target velocity by a visual or audible indication or in any manner desired.

Filter 23 is used to filter the output from amplifier 22 to remove extraneous signals and to limit the frequencies injected into the velocity counter to those desired, in other words, to the doppler frequency. Limiter 24 can be used to limit the amplitude of the signal injected in the frequency counter 23, and therefore, in essence clips the output of filter 23 so that an essentially square wave is input to the frequency counter. The frequency counter operates in a known manner to count the pulses applied by way of the output from limiter 24 so that the number of pulses counted is indicative of the doppler frequency. The doppler frequency is indicative of the velocity of the detected target with respect to the radar system. Accordingly, velocity indicator 26 will receive the output from the frequency counter and yield a visual or audible signal which is indicative of the velocity of the target.

As is more fully explained in the Nagano article referenced hereinabove, the application of the biasing voltage 19 to Gunn diode 11 causes the diode to go into oscillations at a preselected frequency. The oscillating RF energy is coupled to antenna 14 by way of the waveguide section 16. Antenna 14, which can be a horn as illustrated in FIG. 1, is then used to propagate the transmitted energy through space where it impacts with a target and is reflected back and received by the antenna 14. The received energy then is transmitted to the Gunn diode 11 by way of the waveguide 16. Gunn diode 11 mixes the received reflected signal with the transmitted signal resulting in a beat, or doppler frequency output. The beat frequency output is then injected into the input of amplifier 22 from where it is processed in the manner set forth hereinabove and ultimately yields an indication of the velocity of the detected target.

In order to increase the target detection sensitivity of the system, it is necessary to increase the output level of the converted frequency; that is, the doppler frequency. This can be accomplished by inserting a microwave discontinuity into the microwave channel 16 which electrically connects the resonant cavity 12 and the antenna 14.

A simple and inexpensive microwave discontinuity which can be inserted into the waveguide 16 consists of a simple metallic screw which is inserted into the channel. The screw is then adjusted by tuning it in and out until the level of the doppler frequency output over all load conditions is optimized. This can readily be accomplished by energizing the entire system and adjusting the screw while receiving the return signal from a relatively moving target. The adjustment continues until the doppler output level is optimized. The optimization of the doppler frequency may cause a decrease in the total output power transmitted by the antenna 14. However, this constitutes no penalty because there is nevertheless sufficient radiated power to accomplish an effective target detection. The simple expedient of inserting the microwave discontinuity in the channel 16 is effective to increase the target detection sensitivity of the doppler radar system by as much as 5–10 DB.

Another effective type of discontinuity which can be used to effect the increase in target detection sensitivity includes two identical metallic screws which are placed a quarter wavelength apart in waveguide 16. Although the spacing of a quarter wavelength is important, the exact location of the pair of screws within waveguide 16 is unimportant. In this instance, both screws are adjusted while the doppler frequency output is detected and read. The adjustment continues until the doppler output is optimized at which time the screws can be permanently potted or otherwise fixed in their final positions.

Figure 2:
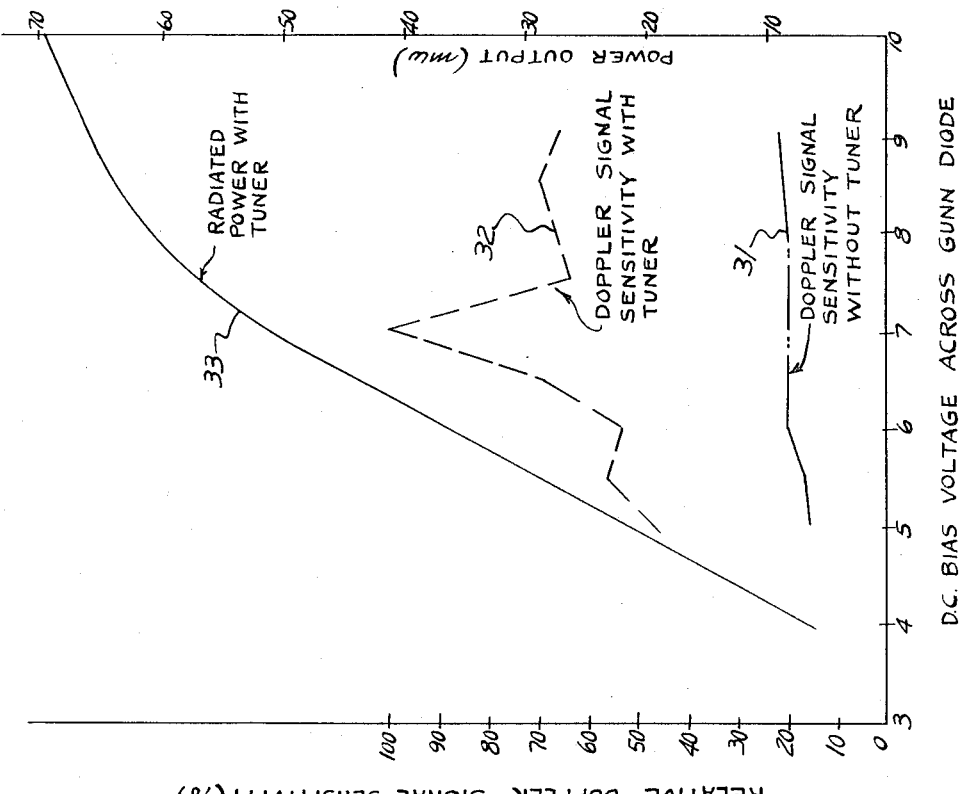
FIG. 2 is a graph showing doppler frequency sensitivity with and without a tuning element, and radiated power with a tuner.

The graph of FIG. 2 is useful in understanding the manner in which tuning while telemetering doppler output, as opposed to radiated power output, is effective to accomplish optimum sensitivity of the system. The data recorded in the graph were read while using an X-band Gunn diode oscillator. In the graph, doppler signal sensitivity is plotted against bias voltage both with and without a microwave discontinuity as a doppler tuning element.

Curve 31 shows the doppler signal sensitivity obtained without the use of a tuning element. The curve shows a slight increase in sensitivity at a bias voltage of approximately 6 volts. Except for this slight increase, the sensitivity is relatively constant.

Curve 32 shows the doppler signal sensitivity obtained while using a tuner. Two factors are readily evident from curve 32. Firstly, a point for point comparison of curve 31 and curve 32 shows that the use of a tuner results in a substantial increase of sensitivity irrespective of the bias voltage across the Gunn diode. Secondly, curve 32 has a sharp peak at a bias voltage of approximately 7 volts. At this point the relative doppler sensitivity is maximum, and therefore, is defined as 100 percent in the graph. This is very significant because the highest sensitivity recorded without a tuner is less than 20 percent of the maximum.

Curve 33 shows radiated power output plotted against D.C. bias voltage with a tuner in waveguide 16. By viewing curves 31, 32, and 33 together the novelty of the invention is readily apparent. If the teachings of the prior art were followed, the radar system would be tuned to a maximum radiated power. Accordingly a 9 or 10 volt bias would be used and the tuner set to obtain approximately 65 milliwatts of radiated power. Curve 32 shows that this is not the setting required for maximum target detection sensitivity. This is so because the doppler frequency power at the settings indicated as optimum by curve 33 is less than 70 percent of that which is obtainable by tuning to the maximum doppler power. Accordingly, the radar set would utilize a 7 volt bias and the tuning element would be set differently from the setting for maximum radiated power. The radiated power at the proper setting is approximately 40 milliwatts, a substantial decrease of approximately 25 milliwatts from the value dictated as ideal by the prior art.

Figure 3:
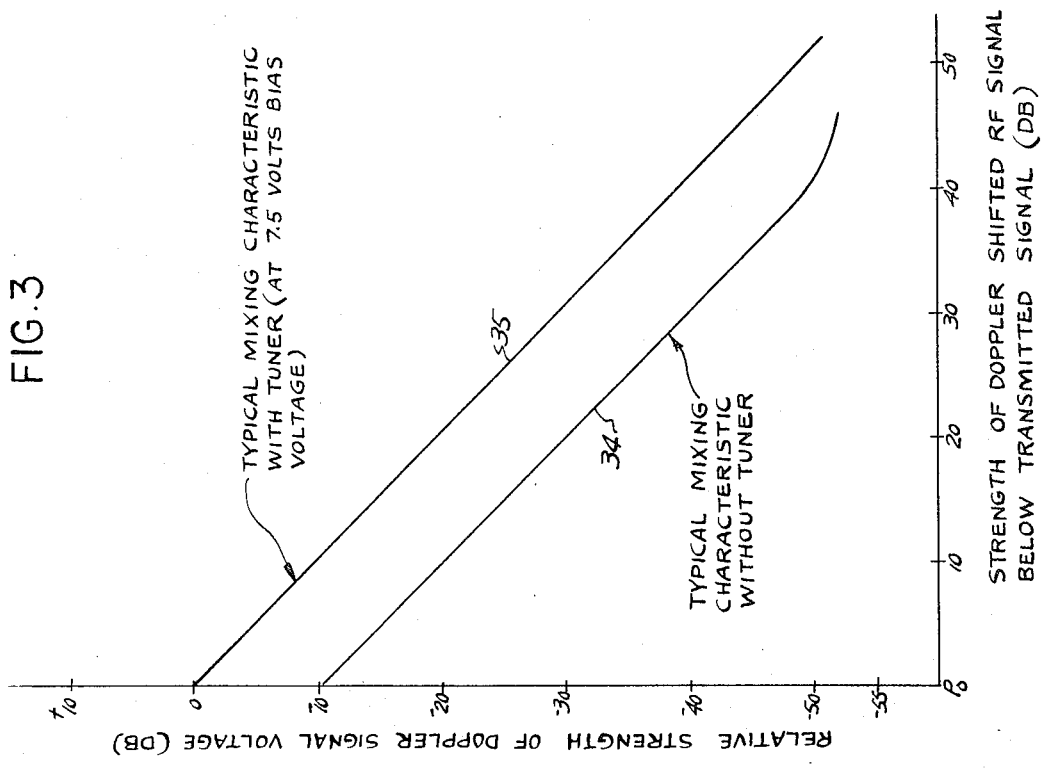
FIG. 3 is a graph showing the improvement in sensitivity realized by the inventive system.

The significant increase in target detection sensitivity gained by following the inventive teaching is illustrated in FIG. 3 which shows curves of relative doppler power plotted against attenuation of doppler signals obtained with and without a tuning element.

Figure 4:
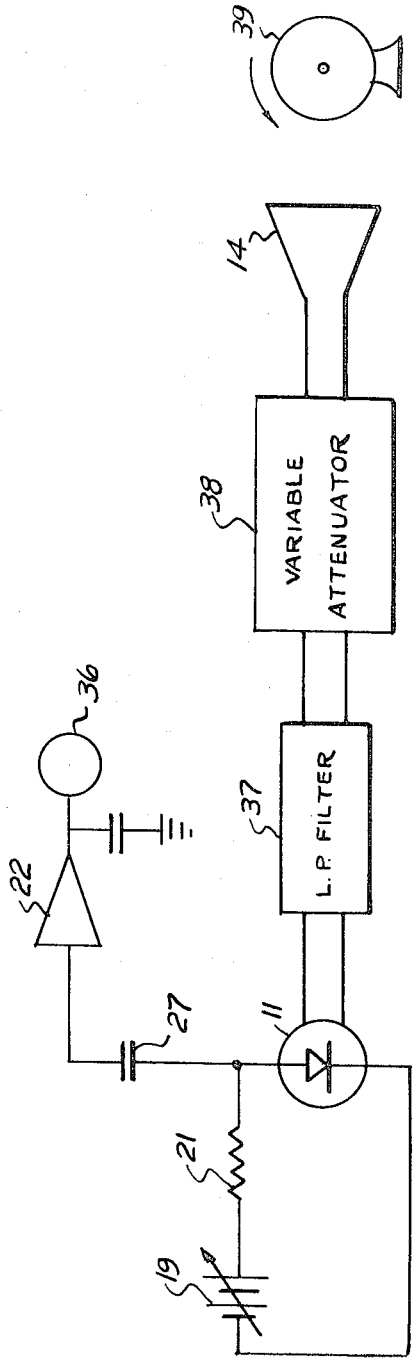
FIG. 4 shows a test circuit used to obtain the data plotted in FIG. 3.

FIG. 4 is useful in fully understanding the curves of FIG. 3 and also shows how the tests were conducted.

The Gunn diode 11 and several other elements were identical to those of FIG. 1 and accordingly are identically numbered. Voltage supply 19 is variable so that the bias voltage on diode 11 can be readily adjusted.

The output of Gunn diode 11 is injected into low pass filter 37 and then goes into variable attenuator 38 for radiation by antenna 14. A rotating doppler simulator 39 reflects energy back to antenna 14.

The reflected energy passes back through attenuator 38 and filter 37 to Gunn diode 11 where it is frequency converted. The doppler frequency output is then applied to amplifier 22 and measured with a RMS voltmeter 36.

The data for the curves of FIG. 3 were obtained by first setting attenuator 38 to zero, and voltage source 19 at a bias voltage of 7.5 volts. Using a tuner to maximize the doppler output, a transmitted power of $P_o$ resulted in a maximum measured doppler voltage across the Gunn diode which is indicated as zero DB in FIG. 3, and therefore, this voltage serves as the reference. Attenuator 38 is then set to 5 DB attenuation so that the reflected signal is 10 DB below the initial radiated power $P_o$. This is indicated by the $P_o - 10$ legend of the graph.

The process continues for 5 DB settings of attenuator 38 until a total of 50 DB attenuation is obtained. At 50 DB attenuation, the relative doppler voltage is approximately −48 DB. It should be noted that for each of the points plotted, the tuning element was adjusted for a maximum doppler output. In a production system, the tuner would be set for some optimum doppler output for all load conditions and permanently set in that position.

Curve 34 of FIG. 3 was obtained in the same manner as curve 35 except the tuner was removed from the system. With attenuator 38 set to zero the doppler frequency voltage was 10 DB lower than it was at the same radiated power $P_o$ with a tuner. In like manner, with a radiated power of $P_o - 10$, the doppler voltage without a tuner is approximately 10 DB below that with a tuner.

Comparing curves 34 and 35 shows that for each setting of attenuator 38 approximately 10 DB sensitivity improvement can be obtained by using a tuner. It is also evident that the maximum doppler frequency voltage was obtained with a tuner and with an attenuator 38 setting of zero DB attenuation.

It is again pointed out that the prior art technique of tuning includes matching the impedance of the oscillator to that of the antenna. This maximizes the radiated power but does not maximize the doppler frequency voltage output as heretofore has always been assumed. The inventive technique utilizes a microwave discontinuity to maximize the doppler output, sometimes at the expense of the radiated power. Accordingly, a mismatch between the oscillator impedance and antenna impedance will normally occur at the optimum doppler frequency power.

What is claimed is:

1. A homodyne doppler radar system having increased target detection sensitivity comprising:
   an oscillation generating and frequency converting means for generating a transmitted signal and mixing said transmitted signal with a received signal to produce a converted frequency;
   a transmitting-receiving antenna for transmitting said transmitted signal and receiving said received signal;
   variable discontinuity means interposed between said generating and mixing means and said antenna, said discontinuity serving to maximize the power level of said converted frequency to thereby increase the sensitivity of said radar system.

2. The radar system of claim 1 further including a waveguide electrically coupling said generating and mixing means and said antenna, said discontinuity being positioned along said waveguide.

3. The radar system of claim 2 wherein said generating and mixing means includes a Gunn diode arranged in a resonant cavity.

4. The radar system of claim 3 further including an adjustable biasing source for further increasing the power level of said converted frequency, said biasing source being connected across said Gunn diode.

5. The radar system of claim 3 wherein said discontinuity includes at least one metallic screw extending into said waveguide.

6. The radar system of claim 5 further including an adjustable biasing source for further increasing the power level of said converted frequency, said biasing source being connected across said Gunn diode.

7. The radar system of claim 5 wherein there are two of said screws positioned apart at a quarter wavelength of said transmitted signal frequency.

8. A doppler radar system having a maximized target detection sensitivity comprising:
   single diode means for generating an RF signal and producing a doppler frequency upon reception of a reflected signal received from a target;
   an adjustable microwave discontinuity for maximizing the power level of said doppler frequency at the possible expense of decreasing the power level of said RF signal to thereby maximize the target detection sensitivity of said radar system.

9. The radar system of claim 8 wherein said single diode means for generating includes a Gunn diode, said Gunn diode simultaneously serving as an oscillator and a mixer.

10. The radar system of claim 9 further including an adjustable biasing source for further increasing the power level of said converted frequency, said biasing source being connected across said Gunn diode.

11. The radar system of claim 10 further including an antenna for transmitting said RF signal and receiving said reflected signal; and microwave means electrically connecting said Gunn diode and said antenna, said discontinuity being arranged to said microwave means so that adjustment of said microwave means optimizes said doppler frequency power while possibly decreasing said RF signal.

12. The radar system of claim 11 wherein said discontinuity includes a screw arranged to extend into said microwave means so that said screw causes an impedance mismatch which decreases said power level of said RF signal but maximizes the power level of said doppler frequency.

13. The radar system of claim 12 further including a second screw positioned in said microswitch means and spaced a quarter wavelength of said RF signal from said first screw, said second screw also extending into said microwave means to enable maximization of the power level of said doppler frequency.

* * * * *

UNITED STATES PATENT OFFICE
CERTIFICATE OF CORRECTION

Patent No. 3,852,743  Dated December 3, 1974

Inventor(s) Radha Raman Gupta

It is certified that error appears in the above-identified patent and that said Letters Patent are hereby corrected as shown below:

IN THE SPECIFICATION

Column 1, line 15 the word "imcoming" should be ---incoming---.

Column 5, line 35, the word "were" should be ---are---.

IN THE CLAIMS

Claim 13

Column 8, line 11, the word "microswitch" should be ---microwave---.

Signed and sealed this 18th day of March 1975.

(SEAL)
Attest:

RUTH C. MASON
Attesting Officer

C. MARSHALL DANN
Commissioner of Patents
and Trademarks